US010201031B2

(12) United States Patent
Belghoul et al.

(10) Patent No.: US 10,201,031 B2
(45) Date of Patent: Feb. 5, 2019

(54) RADIO RESOURCE AGGREGATION WITH SUSPEND/RESUME SUPPORT

(71) Applicant: Apple Inc., Cupertino, CA (US)

(72) Inventors: Farouk Belghoul, Campbell, CA (US); Tarik Tabet, Los Gatos, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 15/347,203

(22) Filed: Nov. 9, 2016

(65) Prior Publication Data

US 2017/0135147 A1    May 11, 2017

Related U.S. Application Data

(60) Provisional application No. 62/253,927, filed on Nov. 11, 2015.

(51) Int. Cl.
*H04W 76/02*   (2009.01)
*H04W 76/16*   (2018.01)
(Continued)

(52) U.S. Cl.
CPC ............ *H04W 76/16* (2018.02); *H04L 5/001* (2013.01); *H04L 5/0098* (2013.01);
(Continued)

(58) Field of Classification Search
CPC . H04W 24/10; H04W 76/026; H04W 76/066; H04W 72/085; H04W 72/042; H04L 5/001; H04L 5/0098
See application file for complete search history.

(56) References Cited

U.S. PATENT DOCUMENTS 8,160,001 B2   4/2012   Bitran
9,414,430 B2   8/2016   Vajapeyam et al.
(Continued)

OTHER PUBLICATIONS

Partial European Search Report, Application No. 16198372.1, dated Apr. 4, 2017, 8 pages.
(Continued)

*Primary Examiner* — Edan Orgad
*Assistant Examiner* — Nourali Mansoury
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to temporary suspension, and subsequent resumption, of radio resource aggregation in a wireless communication system. A wireless device may establish a communication link with a base station. The communication link with the base station may aggregate radio resources according to a first wireless communication technology and a second wireless communication technology. Use by the communication link of radio resources according to the second wireless communication technology may be suspended. Wireless communication activity according to the second wireless communication technology that is not associated with the communication link may be performed while use by the communication link of radio resources according to the second wireless communication technology is suspended. Use by the communication link of radio resources according to the second wireless communication technology may be resumed after performing the wireless communication activity according to the second wireless communication technology.

20 Claims, 10 Drawing Sheets

(51) Int. Cl.
  *H04W 76/36* (2018.01)
  *H04W 24/10* (2009.01)
  *H04W 72/08* (2009.01)
  *H04L 5/00* (2006.01)
  *H04W 84/12* (2009.01)
  *H04W 88/06* (2009.01)

(52) U.S. Cl.
  CPC ......... *H04W 24/10* (2013.01); *H04W 72/085* (2013.01); *H04W 76/36* (2018.02); *H04W 84/12* (2013.01); *H04W 88/06* (2013.01)

(56) References Cited

U.S. PATENT DOCUMENTS

| | | | |
|---|---|---|---|
| 2014/0211655 A1* | 7/2014 | Yoo | H04L 5/005 370/252 |
| 2014/0321376 A1* | 10/2014 | Damnjanovic | H04W 72/1215 370/329 |
| 2015/0289237 A1* | 10/2015 | Kim | H04L 27/26 370/329 |
| 2016/0128110 A1* | 5/2016 | Sirotkin | H04W 76/022 370/329 |
| 2016/0337254 A1 | 11/2016 | Karaki et al. | |
| 2016/0338133 A1 | 11/2016 | Lee et al. | |

OTHER PUBLICATIONS

Qualcomm Incorporated; "WLAN Status Reporting for LWA"; 3GPP Draft; R2-156813_WLAN_Status_Report; 3rd Generation Partnership Project (3GPP); vol. RAN WG2, No. Anaheim, USA; Nov. 16, 2015-Nov. 20, 2015; Nov. 7, 2015 (Nov. 7, 2015); XP051024952; Retrieved from the Internet: URL:http://www.3gpp.org/ftp/tsg ran/WG2 RL2/TSGR2 92/Docs/ [retrieved on Nov. 7, 2015]; 2 pages.

Intel Corporation; Suspend/Resume Functionality for LWA; 3GPP Draft; R2-156743-LWA-Suspend-Resume-V2, 3rd Generation Partnership Project (3GPP); vol. RAN WG2, No. Anaheim, US; Nov. 16, 2015-Nov. 20, 2015; Nov. 7, 2015 (Nov. 7, 2015); XP051024913; Retrieved from the Internet: URL:http://www.3gpp.org/ftp/tsg_ran/WG2_RL2/TSGR2 92/Docs/ [retrieved on Nov. 7, 2015]; 3 pages.

Extended European Search Report, Application No. 16198372.1, dated Jul. 7, 2017, 8 pages.

Qualcomm Incorporated; "Resuming Temporary WLAN Suspension"; 3GPP Draft; R2-168685__LWA_Suspend, 3rd Generation Partnership Project (3GPP); vol. RAN WG2, No. Reno, NV, USA; Nov. 14, 2016-Nov. 18, 2016 Nov. 5, 2016 (Nov. 5, 2016); XP051193174; Retrieved from the Internet: URL:http://www.3gpp.org/ftp/tsg_ran/WG2_RL2/TSGR2_96/Docs/[retrieved on Nov. 5, 2016].

* cited by examiner

RADIO RESOURCE AGGREGATION WITH SUSPEND/RESUME SUPPORT

PRIORITY INFORMATION

This application claims priority to U.S. provisional patent application Ser. No. 62/253,927, entitled "Radio Resource Aggregation with Suspend/Resume Support," filed Nov. 11, 2015, which is hereby incorporated by reference in its entirety as though fully and completely set forth herein.

FIELD

The present application relates to wireless communication systems, including techniques for aggregating radio resources of multiple radio access technologies with support for temporary suspension and resumption of radio resource aggregation.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. While some techniques for coordinating between different wireless communication technologies exist, interworking mechanisms are generally not very well developed, and so improvements in the field would be desirable.

SUMMARY

Embodiments are presented herein of methods for aggregating radio resources of multiple wireless communication technologies and for supporting temporary suspension and resumption of such radio resource aggregation, and of devices configured to implement the methods.

According to the techniques described herein, a wireless device and a base station may establish a communication link that aggregates/integrates radio resources of multiple wireless communication technologies. For example, the base station may provide radio resources according to a cellular communication technology to the wireless device, and a collocated or non-collocated access point communicatively coupled to the base station may provide radio resources according to a wireless local area networking technology to the wireless device. The base station may manage the communication link, e.g., including determining which data is communicated between the wireless device and the base station using the cellular communication technology, and which data is communicated between the wireless device and the base station using the wireless local area networking technology (e.g., by way of the co-located or non-co-located access point).

At some point while the communication link is established, the wireless device may determine to perform wireless communication activity according to the wireless local area networking technology that is not associated with the communication link. For example, the wireless device may periodically perform data exchanges with a paired device, and/or scan for other available access points, using the same wireless interface as is used to perform wireless local area networking communication in conjunction with the communication link. In such a case, it is proposed herein that the wireless device be able to suspend the use of the wireless local area networking technology by the communication link with the base station, in a manner that allows for quickly resuming use of the wireless local area networking technology by the communication link with the base station after completion of the other wireless communication activity.

For example, a set of suspend/resume signaling indications may be defined, and may be provided by the wireless device to the base station to indicate when to suspend radio resource aggregation by the communication link with the base station, and when to resume radio resource aggregation by the communication link with the base station. While the radio resource aggregation is suspended, the wireless device and the base station may maintain the radio resources according to the wireless local area networking technology associated with the communication link (but may choose not to communicate data using them), such that when the wireless device indicates to the base station to resume radio resource aggregation, both the cellular communication technology and the wireless local area networking technology may be used to communicate data without requiring the wireless device to establish the wireless local area networking aspect of the communication link de novo.

The techniques described herein may be implemented in and/or used with a number of different types of devices, including but not limited to cellular base stations, access point devices, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
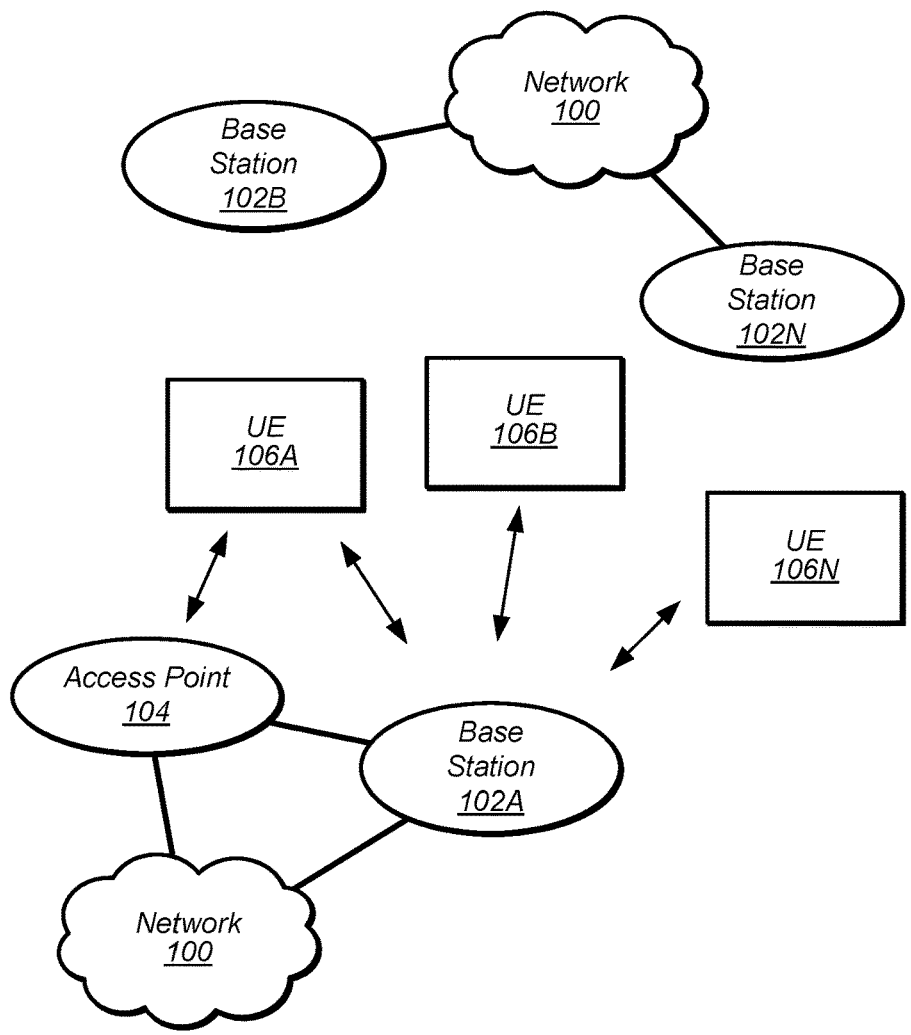
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
WLAN: Wireless Local Area Networking Terms The following is a glossary of terms used in this disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer for execution. The term "memory medium" may include two or more memory mediums that may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that are mobile or portable and that performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
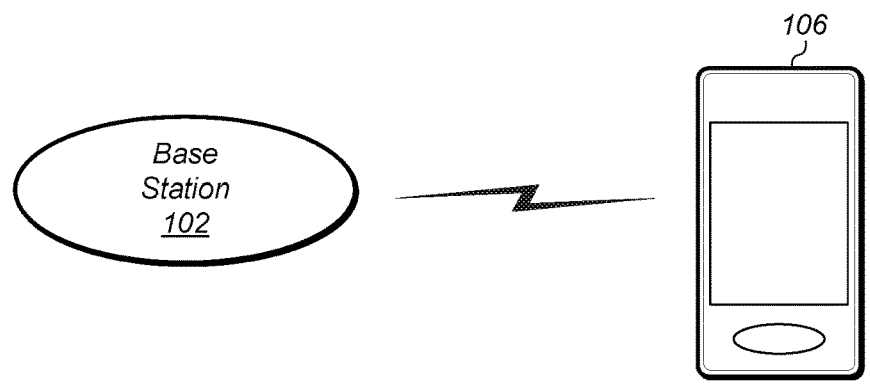
FIG. 2 illustrates an example base station (BS) in communication with an example user equipment (UE) device, according to some embodiments.

FIGS. 1 and 2—Communication System

FIG. 1 illustrates an exemplary (and simplified) wireless communication system in which aspects of the present disclosure may be implemented, according to some embodiments. It is noted that the system of FIG. 1 is only one example of a possible system, and embodiments may be implemented in any of various systems, as desired.

As shown, the exemplary wireless communication system includes a base station 102A, which can communicate over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site (a "cellular base station"), and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, NEV-DO, HRPD, eHRPD), Wi-Fi, WiMAX etc.

Additionally, one or more access points (such as access point 104) may be communicatively coupled to the network 100, and may be within communicative range of one or more UEs 106. These may include Wi-Fi access points configured to support cellular network offloading and/or otherwise provide wireless communication services as part of the wireless communication system illustrated in FIG. 1. Such access points may be collocated with a cellular base station or may be deployed separately from any cellular base stations, as desired. In some instances (e.g., for network-deployed access points), such an access point may have a backhaul communication reference point with a base station, such as illustrated between access point 104 and base station 102A.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a wide geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells that provide any of various other granularities of service area size. For example, base stations 102A-102B illustrated in FIG. 1 might provide macro cells, base station 102N might provide a micro cell, and access point 104 might be a Wi-Fi AP that provides a WLAN. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
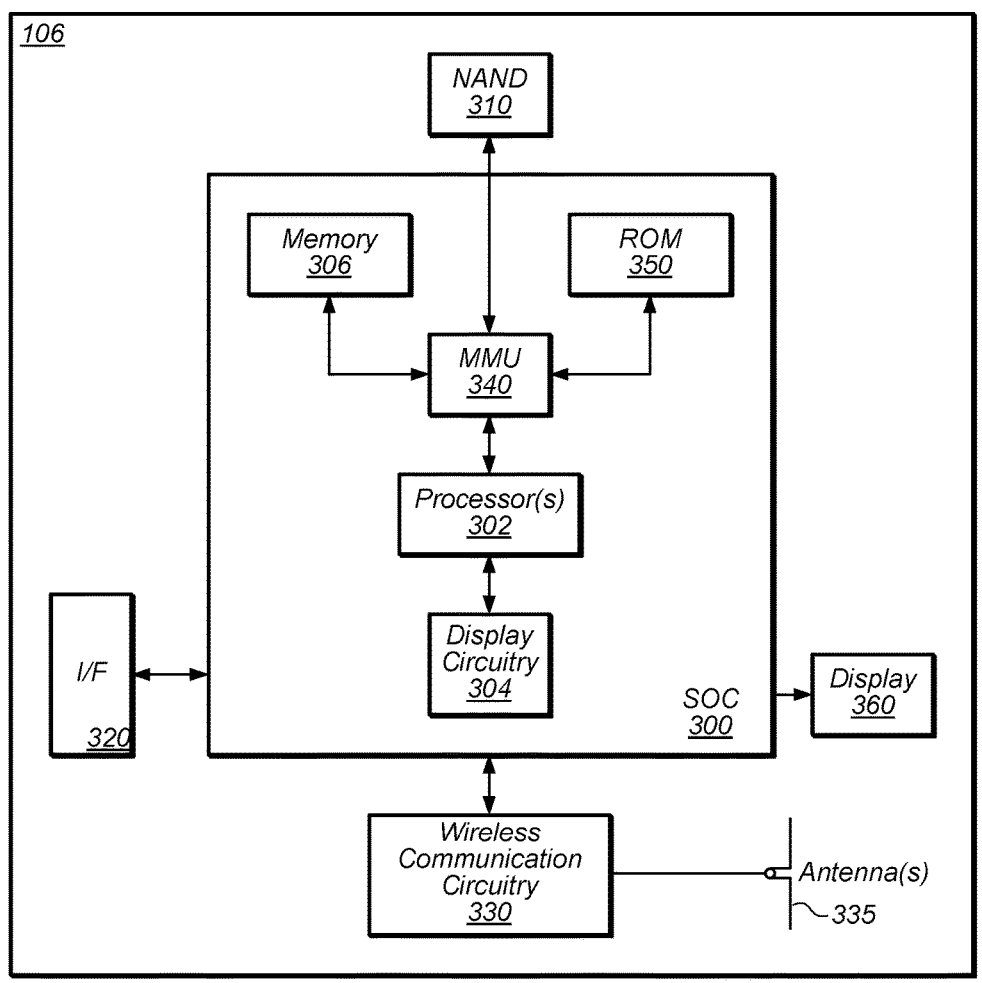
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described further subsequently herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
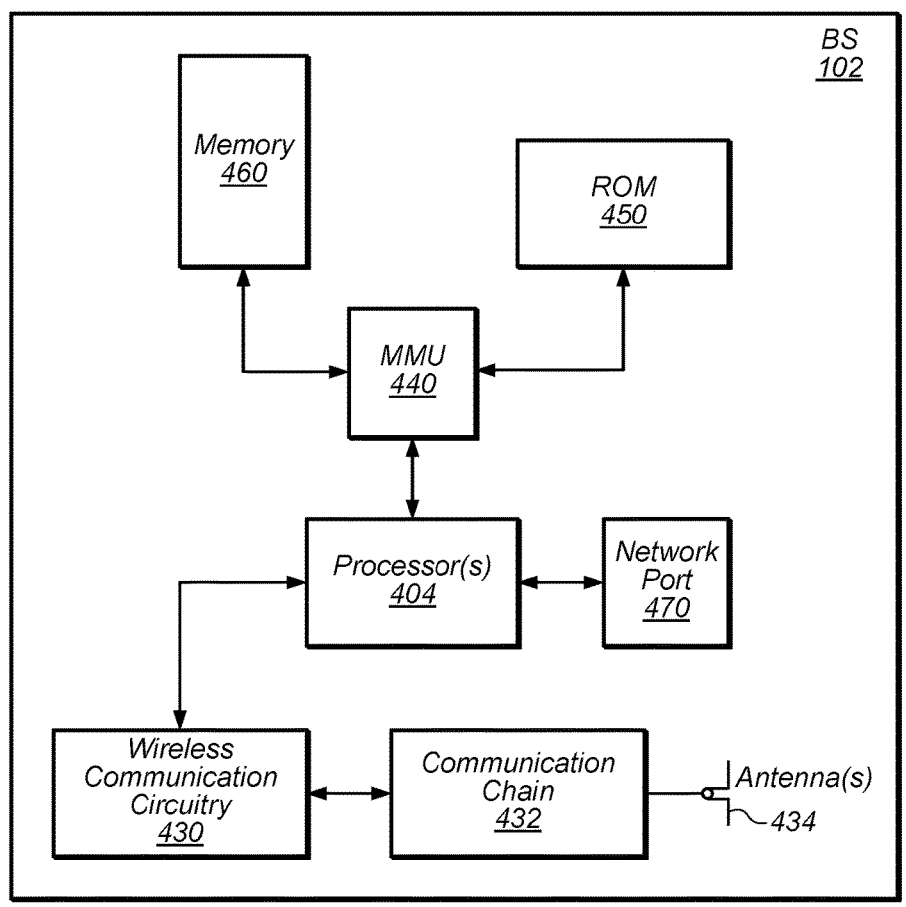
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU)

440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via wireless communication circuitry (e.g., radio) 430. The antenna(s) 434 communicates with the wireless communication circuitry 430 via communication chain 432. Communication chain 432 may be a receive chain, a transmit chain or both. The radio 430 may be configured to communicate via various wireless telecommunication standards, including, but not limited to, LTE, LTE-A, GSM, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio that is capable of performing communications according to any of multiple wireless communication technologies (e.g., LTE and Wi-Fi, LTE and UMTS, etc.).

The BS 102 may include hardware and software components for implementing part or all of the methods described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

FIGS. 5-11

As previously noted, it is increasingly common for wireless devices to be equipped with the capability to communicate using multiple wireless communication technologies. For example, many smart phones are able to communicate using both IEEE 802.11 wireless local area networking (WLAN) and 3GPP (LTE/UMTS/GSM) and/or 3GPP2 (CDMA2000/cdmaOne) cellular radio interfaces, such that a user of such a device may be able to use a cellular data connection simultaneously with a WLAN connection.

Furthermore, increasingly small cells with collocated WLAN/cellular interface are being deployed by cellular network operators. In such cases, operator provided WLAN access points may be used for traffic offloading, for example with 3GPP traffic offloading and interworking mechanisms between cellular and WLAN base stations and access points. Techniques for providing integrated cellular and WLAN dual connectivity, in conjunction with collocated operator deployed WLAN/cellular cells and more generally, may improve user throughput, Quality of Service, and network utilization/radio resource efficiency. As examples, LTE-WLAN Aggregation (LWA) and LTE-WLAN integration with Internet Protocol security tunnel (LWIP) procedures may respectively provide PDCP and IPSec based data path aggregation of LTE and WLAN radio resources. Note that in some instances, LWA may alternatively be referred to as WLAN-LTE aggregation or WLA.

Figure 5:
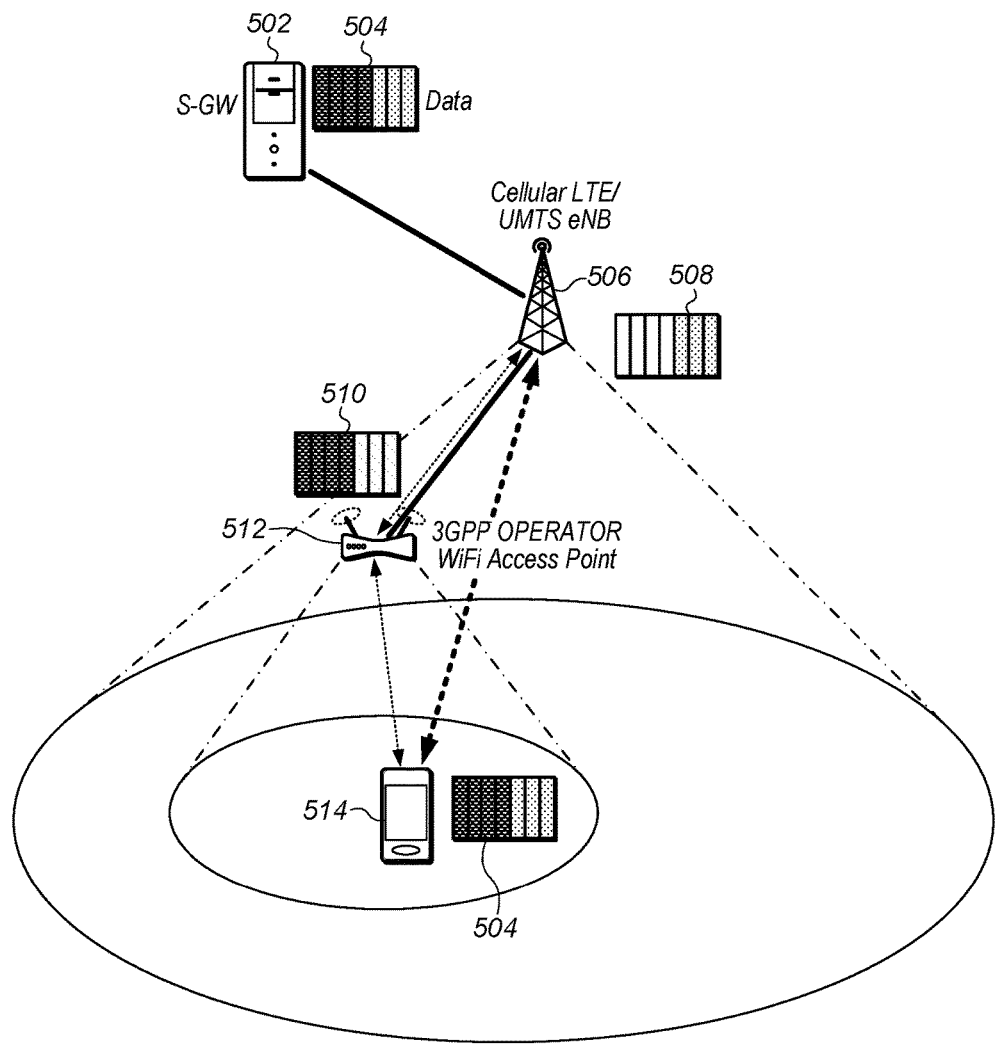
FIGS. 5-6 illustrate exemplary non-collocated and collocated network deployment scenarios, according to some embodiments.
Figure 6:
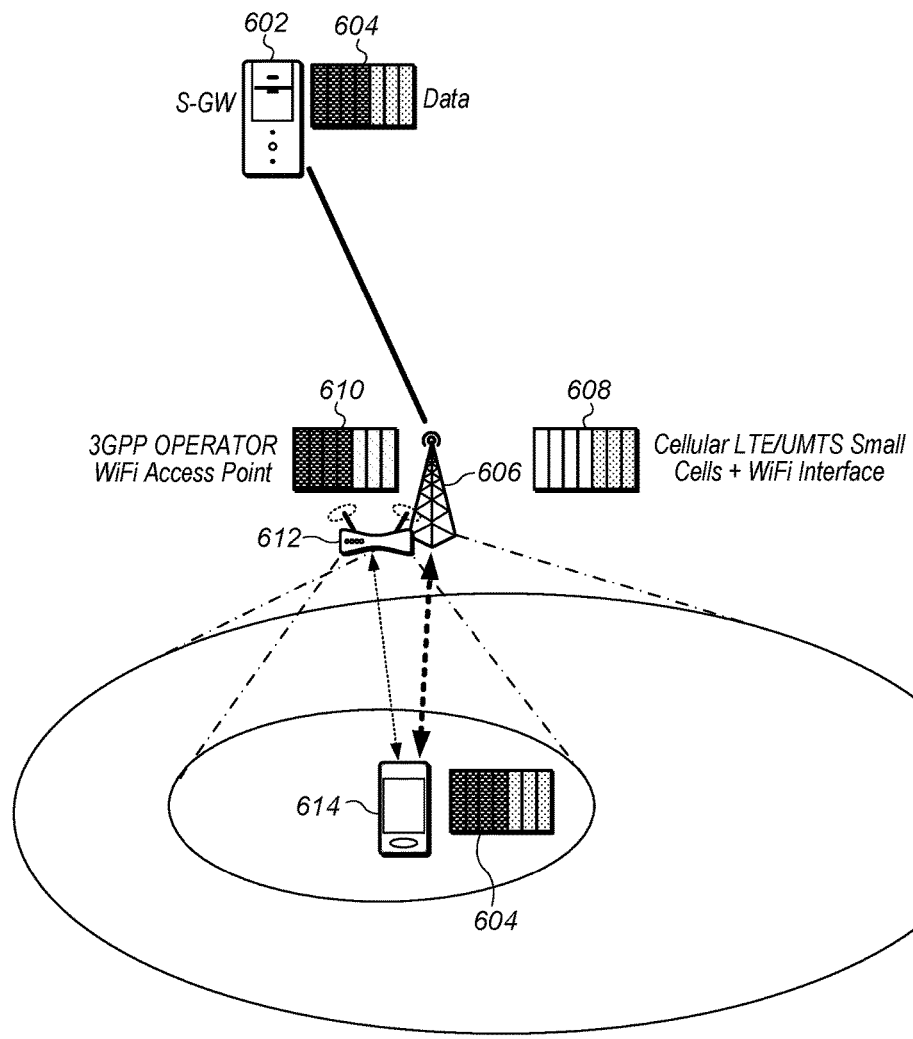

Such dual connectivity may be facilitated by providing for a cellular base station to act as an anchor point for aggregating radio resources according to multiple wireless communication technologies. FIGS. 5-6 illustrate possible example scenarios in which multi-RAT radio resource aggregation may be implemented, according to some embodiments.

FIG. 5 illustrates a scenario in an exemplary 3GPP network deployment in which a cellular base station (LTE/UMTS eNB) and a 3GPP network operator deployed Wi-Fi access point have overlapping coverage area but are not-collocated, according to some embodiments.

As shown, a serving gateway (S-GW) 502 in a cellular core network may have data 504 to send to a wireless user equipment device 514. The S-GW 502 may have a backhaul connection with the eNB 506, which may provide radio resources to the UE 514 according to a cellular (e.g., LTE or UMTS) radio interface and be an anchor point for radio resource aggregation for the UE 514. The eNB 506 may also have a backhaul connection with the AP 512, which in turn may provide radio resources to the UE 514 according to a WLAN (Wi-Fi) radio interface. The cellular and Wi-Fi radio resources may be aggregated using LWA or LWIP, among various possibilities.

As shown, of the data 504, a first portion 508 may be transmitted to the UE 514 by the eNB 506 directly by way of the cellular radio interface between the UE 514 and the eNB 506. A second portion 510 may be redirected by the eNB 506 to the AP 512, which may in turn transmit the second portion 510 to the UE 514 by way of the WLAN radio interface between the UE 514 and the AP 512. The UE 514 may thus receive both the first portion 508 and the second portion 510 such that all of the data 504 is recovered by the UE 514.

Note that as one possibility, the data 504 may all be associated with a single radio bearer that may be in a split bearer configuration such that the portions 508, 510 may be transmitted using different radio interfaces. As a further possibility, the data 504 may include data associated with multiple radio bearers. For example, the first portion 508 may be associated with a radio bearer that is not offloaded or split but exclusively uses the cellular radio interface, while the second portion 510 may be associated with a different radio bearer that is offloaded to the WLAN interface.

FIG. 6 illustrates a possible multi-RAT radio resource aggregation scenario in an exemplary 3GPP network deployment in which a cellular base station (LTE/UMTS small cell) and a 3GPP network operator deployed Wi-Fi access point have overlapping coverage area and are collocated, according to some embodiments.

As shown, a serving gateway (S-GW) 602 in a cellular core network may have data 604 to send to a wireless user equipment device 614. The S-GW 602 may have a backhaul connection with the small cell 606, which may provide radio resources to the UE 614 according to a cellular (e.g., LTE or UMTS) radio interface and be an anchor point for radio resource aggregation for the UE 614. The small cell 606 may also have a backhaul connection with the AP 612, which it turn may provide radio resources to the UE 614 according to a WLAN (Wi-Fi) radio interface. The cellular and Wi-Fi radio resources may be aggregated using LWA or LWIP, among various possibilities.

Much as in the scenario of FIG. 5, of the data 604, a first portion 608 may be transmitted to the UE 614 by the small cell 606 directly by way of the cellular radio interface between the UE 614 and the small cell 606. A second portion 610 may be redirected by the small cell 606 to the AP 612, which may in turn transmit the second portion 610 to the UE 614 by way of the WLAN radio interface between the UE 614 and the AP 612. The UE 614 may thus receive both the first portion 608 and the second portion 610 such that all of the data 604 is recovered by the UE 614.

Similarly as described with respect to FIG. 5, the data 604 may all be associated with a single radio bearer that may be in a split bearer configuration such that the portions 608, 610 may be transmitted using different radio interfaces, or may include data associated with multiple radio bearers, of which one may be offloaded and one may not be offloaded, among various possibilities.

Figure 7:
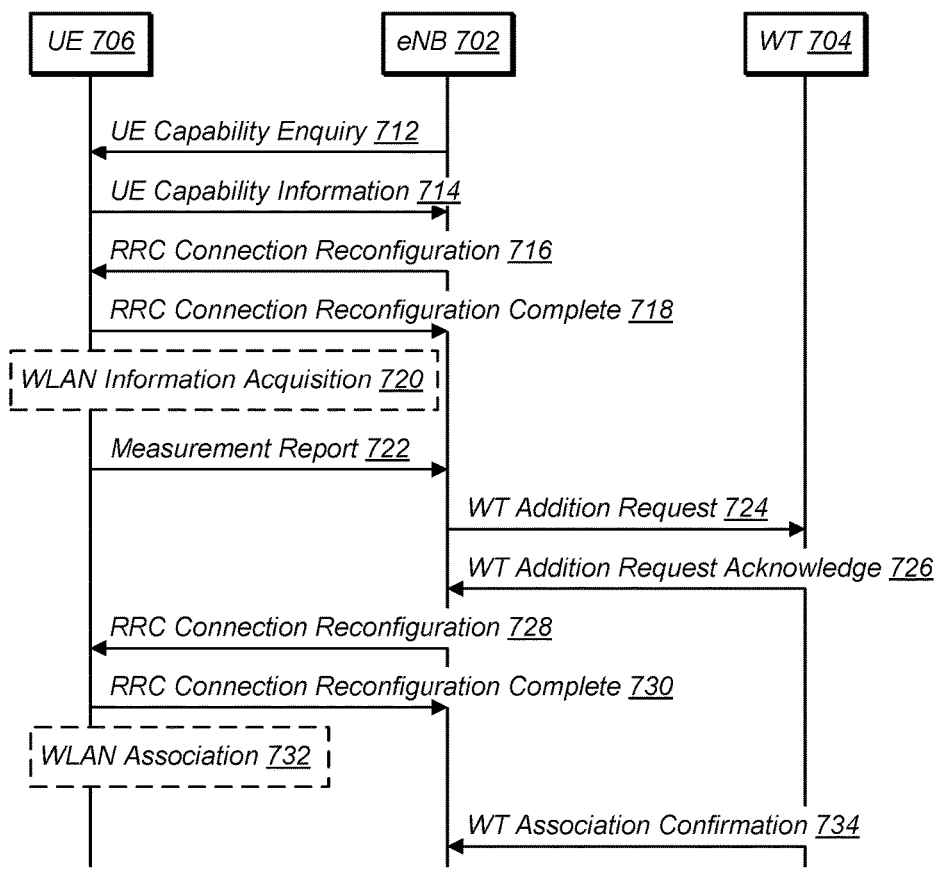
FIG. 7 illustrates an exemplary communication flow for establishing radio resource aggregation, according to some embodiments.

FIG. 7 is a communication/signal flow diagram illustrating an exemplary call flow to set up radio resource aggregation of LTE and Wi-Fi resources according to LWA. Such a procedure may, for example, be used in a network deployment scenario such as illustrated in and described with respect to either or both of FIGS. 5-6. Note that while the exemplary signal flow of FIG. 7 is intended to be illustrative of one possible signal flow that can be used to set up radio resource aggregation of LTE and Wi-Fi resources, other signal flows (e.g., including variations of the LWA signal flow of FIG. 7 or alternative signal flows, such as signal flows for establishing LWIP based LTE-Wi-Fi radio resource aggregation) can also be used.

As shown, in 712, an eNB 702 may initially send a UE capability enquiry to a UE 706 served by the eNB 702. In 714, the UE 706 may respond with UE capability information, which may indicate that the UE 706 is capable of aggregation of cellular and Wi-Fi radio resources. In 716, the eNB 702 may provide a RRC connection reconfiguration message to the UE 706, which may trigger the UE 706 to attempt to discover any WLANs suitable for radio resource aggregation by the eNB 702 (e.g., WLANs provided by wireless terminals deployed by the same network operator that operates the eNB 702). In 718, the UE 706 may respond with an RRC connection reconfiguration complete message, and may perform WLAN information acquisition for potentially available WLANs in 720. Based on this WLAN information acquisition, in 722, the UE 706 may provide a measurement report to the eNB 702.

In 724, based on the measurement report, the eNB 702 may provide a Wi-Fi terminal (WT) addition request to a selected WT 704. In 726, the WT 704 may respond with a WT addition request acknowledgement. In 728, the eNB 702 may follow up by providing a RRC connection reconfiguration message to the UE 706, e.g., to indicate to the UE 706 to associate with the selected WT 704. In 730, the UE 706 may respond with a RRC connection reconfiguration complete message, and may form a WLAN association with the WT 704 in 732. Once the UE 706 has completed the WLAN association with the WT 704, in 734, the WT 704 may also confirm that completion of the WLAN association between the UE 706 and the WT 704 by providing a WT association confirmation message to the eNB 702.

Figure 8:
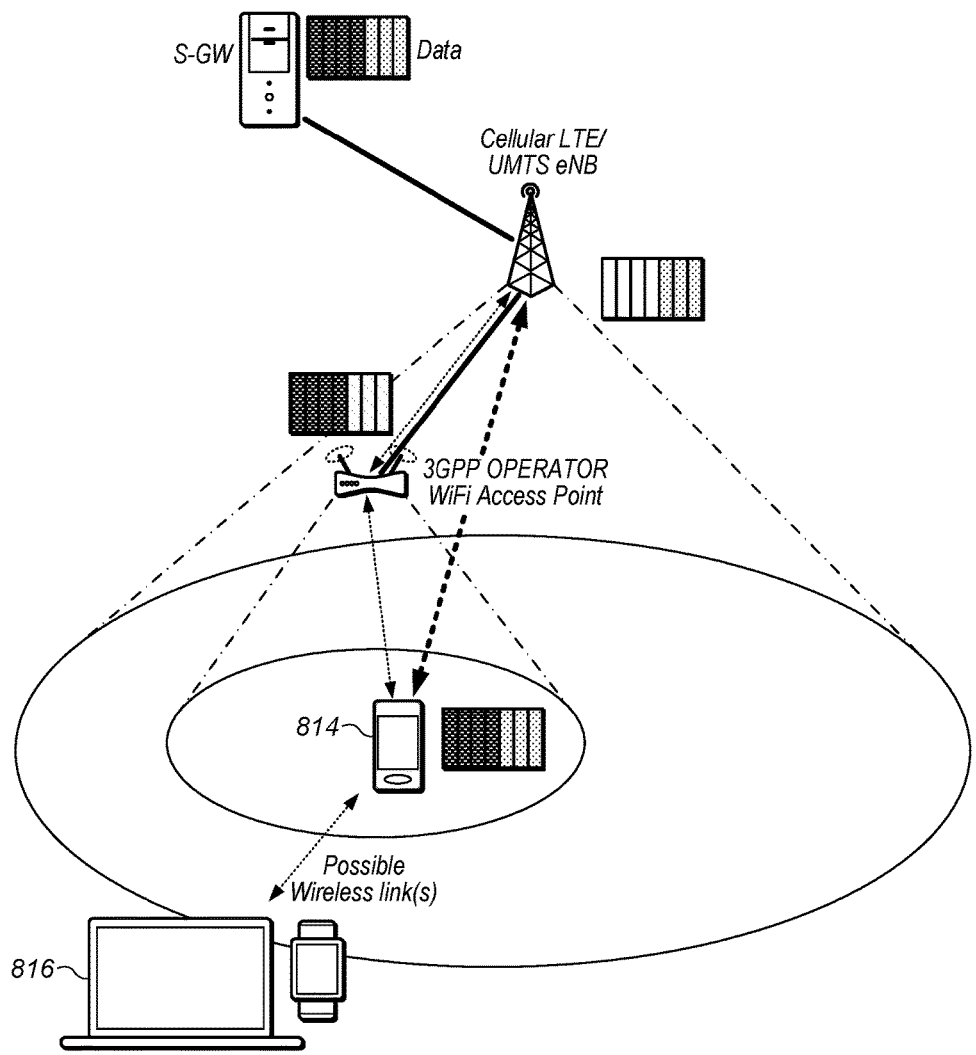
FIG. 8 illustrates an exemplary non-collocated network deployment scenario in which a wireless device also wishes to establish a wireless link with one or more other devices, according to some embodiments.

FIG. 8 illustrates a network deployment scenario similar to the scenario illustrated in and described with respect to FIG. 5, e.g., in which a cellular base station and a network operator deployed Wi-Fi access point have overlapping coverage area but are not-collocated. Additionally, in this scenario one or more additional devices 816 (e.g., laptop computer, smart watch, etc.) may be within communication range of the wireless device 814. As a result, there may be occasions on which the wireless device 814 wishes to perform communication with one or more of the additional devices 816 as well as occasions on which the wireless device 814 wishes to perform communication with the cellular network.

However, at least in some instances, once LWA or LWIP is configured, the Wi-Fi interface/chipset in the UE may be under the control of the eNB and may be used exclusively for LTE aggregation. If the UE has a single Wi-Fi interface, this may limit the ability of the UE to perform concurrent Wi-Fi activities (e.g., using Apple Wireless Direct Link (AWDL), Wi-Fi peer-to-peer, or other Wi-Fi based communication), such as connecting to another device to perform short data transmissions and/or providing continuity services, probing other frequencies as part of Wi-Fi AP scan procedures, etc.

Figure 9:
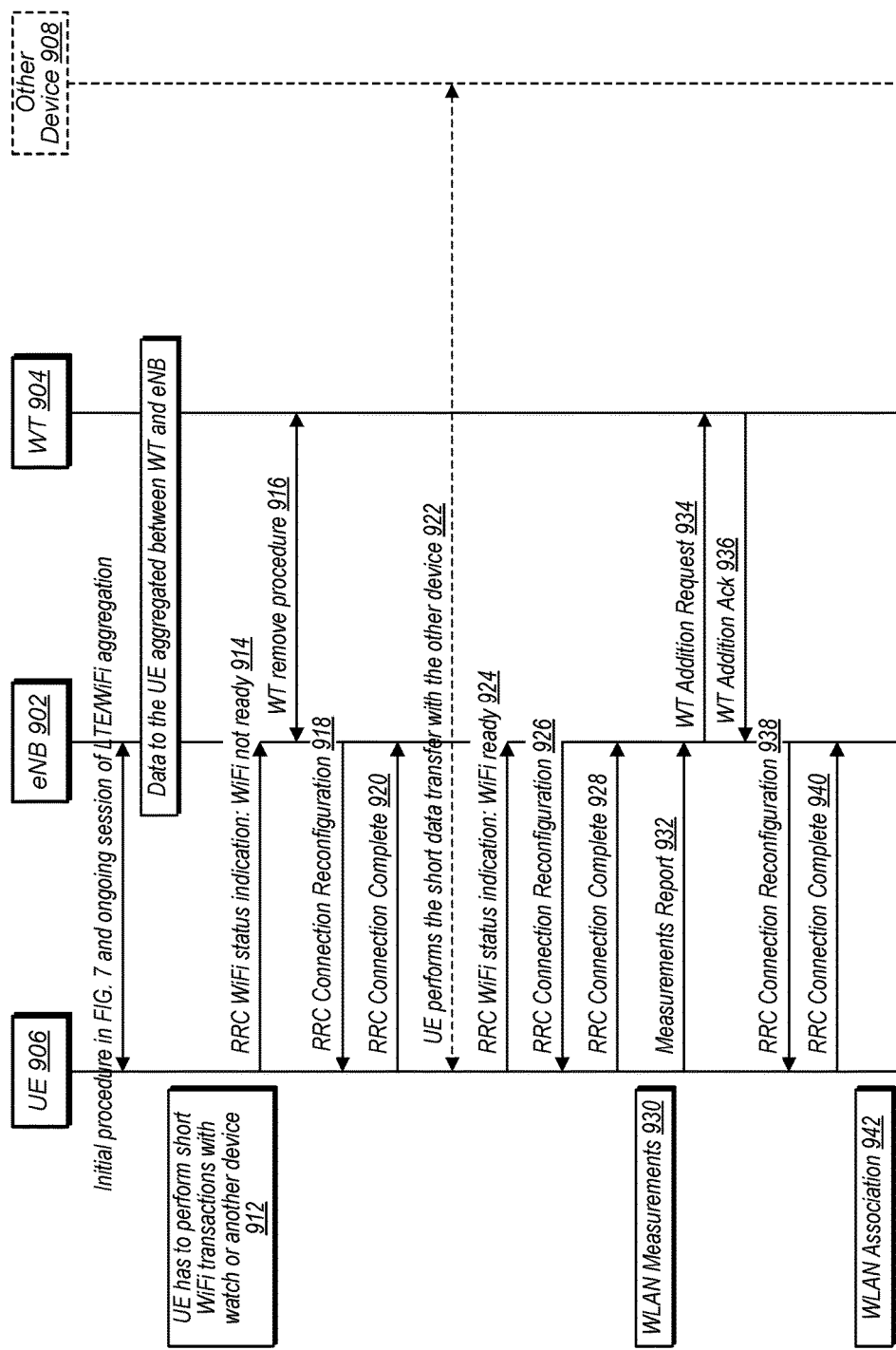
FIG. 9 illustrates an exemplary communication flow for interleaving a communication with another device with radio resource aggregation communication with a network without suspend/resume procedures, according to some embodiments.

In other words, such 'micro' or 'mini' transactions may not currently be possible without ending an aggregation session. FIG. 9 illustrates a communication flow scenario in which such a scenario plays out, including terminating an LWA aggregation session and disconnecting from the Wi-Fi Terminal (WT) (e.g., the access point used for LWA aggregation) prior to performing the micro transaction, then starting the LWA aggregation procedure anew after completion of the micro transaction.

As shown, in such a scenario, after initially establishing an LWA aggretation session such as according to the method of FIG. 7 and communicating data to the UE 906 aggregated between the WT 904 and the eNB 902, in 912 the UE 906 may determine that it has one or more other Wi-Fi transactions to perform, e.g., with a watch, tablet, laptop, and/or another such wireless device, indicated in FIG. 9 simply as 'other device 908' for convenience.

In order to connect with the other device 908 for the Wi-Fi data exchange while the aggregation session is in place, in 914, the UE 906 may send a status indication to the eNB indicating 'Wi-Fi not ready', in response to which the eNB may decide to end the aggregation session, and, in 916, may provide an indication to the WT 904 to initiate a WT remove procedure, and in 918, may send a RRCConnectionReconfiguration message to the UE 906 to disable aggregation. In 920, the UE 906 may confirm to the eNB 902 that RRC connection reconfiguration is complete, and in 922, the UE 906 may then perform the 'micro transaction' with the other device 908.

Following the 'micro transaction', there may be no way to resume the LWA aggregation session, and so the UE 906 may attempt to start a new LWA aggregation session. For example, in 924, the UE 906 may provide an RRC Wi-Fi status indication to the eNB 902 indicating that Wi-Fi is ready for the UE 906; in 926, the eNB 902 may provide a RRC connection reconfiguration message to the UE 906; in 928, the UE 906 may respond with a RRC connection reconfiguration complete message; in 930, the UE 906 may perform WLAN measurements; in 932, the UE 906 may provide a measurement report to the eNB 902; in 934, the eNB 902 may provide a WT addition request to the WT 904; in 936, the WT 904 may provide a WT addition request acknowledgement to the eNB 902; in 938, the eNB 902 may provide a RRC connection reconfiguration message to the UE 906; in 940, the UE 906 may respond with a RRC connection reconfiguration complete message; and in 942, the UE 906 may perform WLAN association with the WT 904.

As an alternative, according to some embodiments, radio resource aggregation suspend and resume procedures may be available. Such procedures may allow a wireless device and a base station to suspend a radio resource aggregation session without terminating the session entirely. Note that such procedures may be used in conjunction with either or both of LWA or LWIP, and/or with other techniques for handling aggregation of radio resources according to multiple wireless communication technologies.

For example, according to some embodiments, a first wireless device and a base station may establish a communication link that aggregates radio resources according to a first wireless communication technology (e.g., a cellular communication technology such as LTE or UMTS) and a second wireless communication technology (e.g., a wireless local area networking technology such as Wi-Fi). The communication link may aggregate radio resources according to LWA, LWIP, or any other technique for aggregating radio resources of multiple wireless communication technologies. At some point, the first wireless device may determine to (e.g., temporarily) suspend radio resource aggregation (e.g., suspend use of radio resources according to the second wireless communication technology by the communication link), for example in order to perform some wireless communication activity according to the second wireless communication technology that is not associated with the communication link. As one possibility, the wireless communication activity according to the second wireless communication technology could include a wireless communication transaction (e.g., for synchronization, continuity services, etc.) with a second wireless device according to the second wireless communication technology. As another possibility, the wireless communication activity according to the second wireless communication technology could include scanning/probing for alternative services/networks available according to the second wireless communication technology, such as according to Wi-Fi AP scanning procedures.

Note that, according to some embodiments, the first wireless device may determine to suspend the radio resource aggregation of the communication link based on a decision whether to temporarily suspend the radio resource aggregation of the communication link or to terminate the radio resource aggregation of the communication link, in order to perform the other wireless communication activity. For example, depending on the scope of the other wireless communication activity, in some scenarios it may make sense to terminate the radio resource aggregation session altogether (e.g., if the wireless communication activity is expected to take a longer time, such as a length of time above an expected length threshold), while in other scenarios it may make sense to temporarily suspend the radio resource aggregation session (e.g., if the wireless communication activity is expected to take a shorter time, such as a length of time below an expected length threshold) such that the radio resource aggregation session can be easily resumed after the other wireless communication activity is complete.

In order to suspend the radio resource aggregation of the communication link with the base station, the first wireless device may indicate to the base station (e.g., by way of the first wireless communication technology) to suspend the radio resource aggregation of the communication link with the base station. In some instances, the first wireless device may more particularly indicate to the base station to suspend use of radio resources according to the second wireless communication technology (e.g., allowing the continued use of the first wireless communication technology and potentially any other communication technologies used in conjunction with the communication link). In response, the base station may cease communicating data with the first wireless device using radio resources according to the second wireless communication technology (e.g., may communicate data using just radio resources according to the first wireless communication technology while radio resource aggregation is suspended). Note that the base station and the first wireless device may maintain their radio resources with each other according to the second wireless communication technology even while their use is suspended. For example, the first wireless device can remain associated with an access point (which may in turn be coupled to or comprised in the base station) providing radio resources to the first wireless device according to the second wireless communication technology as part of the radio resource aggregation of the communication link with the base station.

The first wireless device may perform the wireless communication activity (e.g., performing wireless communication with the second wireless device according to the second wireless communication technology, performing Wi-Fi AP scan procedures, etc.) while radio resource aggregation of the communication link with the base station is suspended/use of radio resources according to the second wireless communication technology by the communication link with the base station is suspended.

Once the wireless communication activity according to the second wireless communication technology is complete, the first wireless device may indicate (e.g., by way of the first wireless communication technology) to resume the radio resource aggregation of the communication link with the base station. In some instances, the first wireless device may more particularly indicate to the base station to resume use of radio resources according to the second wireless communication technology for the communication link between the base station and the first wireless device. In response, the base station may resume communicating data with the first wireless device using radio resources according to the second wireless communication technology (e.g., may communicate data using both radio resources according to the first wireless communication technology and the second wireless communication technology). Note that, at least in some instances, resuming radio resource aggregation of the communication link with the base station may be a simpler process than initially establishing radio resource aggregation for the communication link with the base station (e.g., since the radio resources according to the second wireless communication technology may have been maintained while radio resource aggregation of the communication link with the base station was suspended). For example, the resume process may take less time, involve fewer signaling messages between the first wireless device and the base station (and possibly the access point), and/or otherwise be simplified relative to the initial radio resource aggregation establishment procedure.

Figure 10:
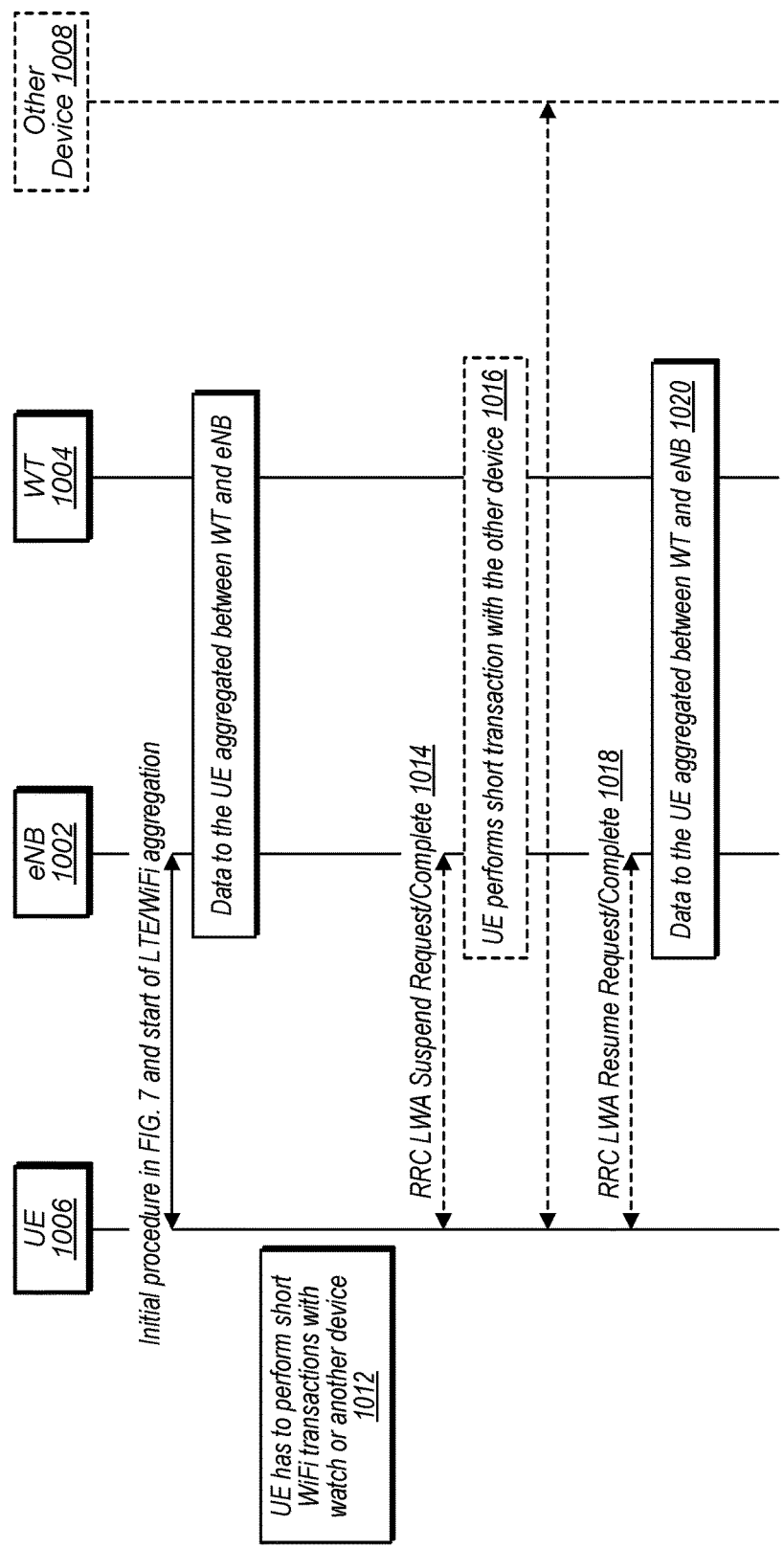
FIGS. 10-11 illustrate exemplary communication flow for interleaving a communication with another device with radio resource aggregation communication with a network with suspend/resume procedures, according to some embodiments.
Figure 11:
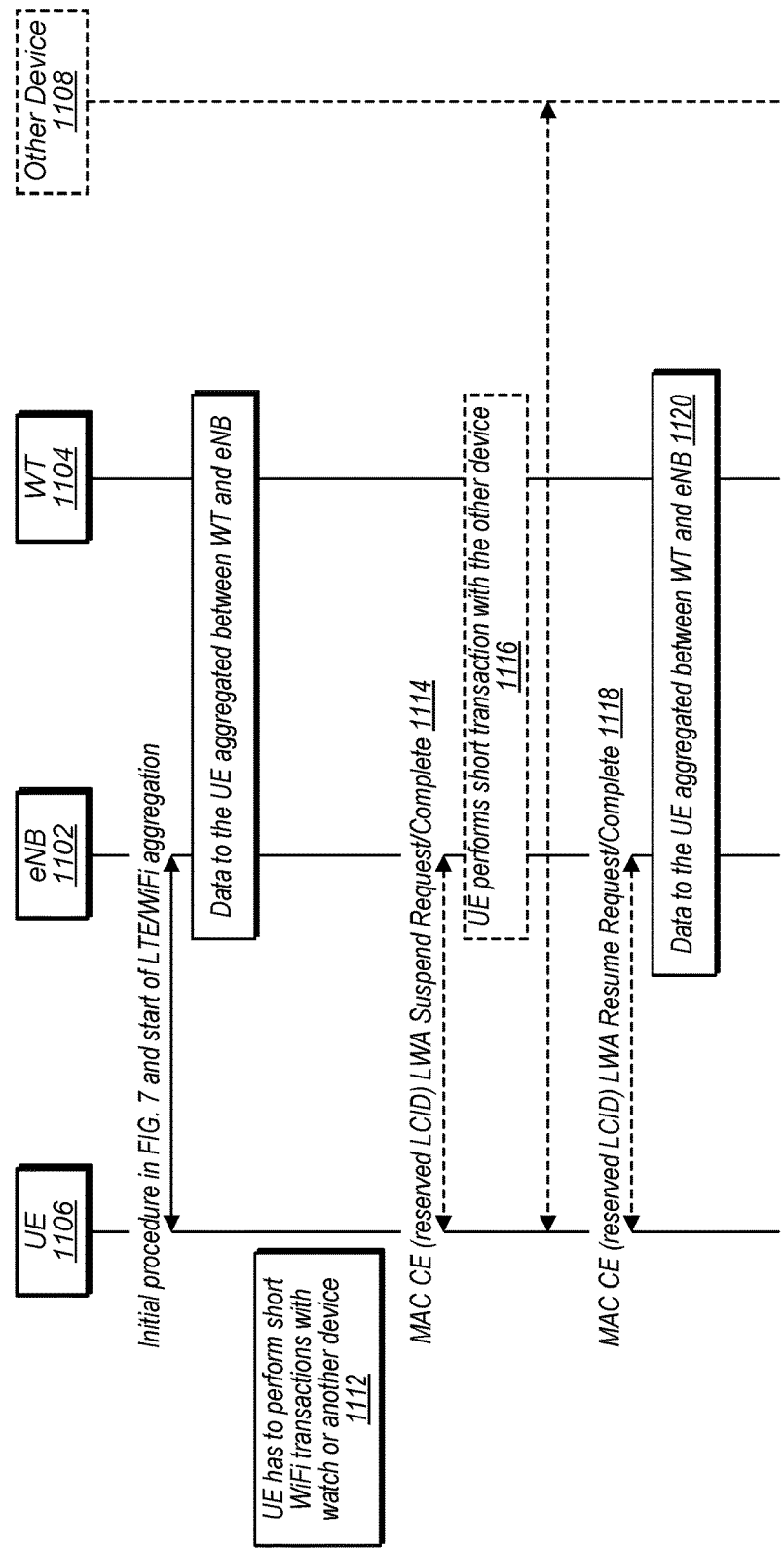

FIGS. 10 and 11 illustrate example communication flows in exemplary LWA scenarios in which the first wireless communication technology is LTE and the second wireless communication technology is Wi-Fi.

In the scenario illustrated in FIG. 10, suspend/resume procedures may be invoked by way of RRC messages exchanged between the first wireless device and the base station. As shown, after initially establishing an LWA aggretation session such as according to the method of FIG. 7 and communicating data to the UE 1006 aggregated between the WT 1004 and the eNB 1002, in 1012 the UE 1006 may determine that it has one or more other Wi-Fi transactions to perform, e.g., with a watch, tablet, laptop, and/or another such wireless device, indicated in FIG. 10 simply as 'other device 1008' for convenience.

In order to connect with the other device 1008 for the Wi-Fi data exchange while the aggregation session is in place, in 1014, the UE 1006 and the eNB 1002 may exchange RRC LWA Suspend Request and RRC LWA Suspend Complete messages. Based on this exchange, the eNB 1002 may refrain from providing data to the UE 1006 by way of the Wi-Fi link between the UE 1006 and the WT 1004. Note that the WT 1004 and the UE 1006 may remain associated (e.g., the UE 1006 may remain a member of the basic service set (BSS) of the WT 1004) while the LWA session is suspended. While the LWA session is suspended, in 1016, the UE 1006 may perform its wireless transaction with the other device 1008 via Wi-Fi communication. Once the wireless transaction is complete, in 1018, the UE 1006 and the eNB 1002 may exchange RRC LWA Resume Request and RRC LWA Suspend Complete messages. Based on this exchange, the eNB 1002 may resume providing data to the UE 1006 by way of the Wi-Fi link between the UE 1006 and the WT 1004. Since the WT 1004 and the UE 1006 may have remained associated throughout, the UE 1006 may be able to avoid any or all of performing Wi-Fi measurements, reporting those measurements to the eNB 1002, or performing signaling to associate with the WT 1004 to resume the LWA session.

Note that while according to the scenario of FIG. 10 RRC LWA Suspend/Resume Request/Complete messages are used to request and acknowledge suspension and resumption of LWA aggregation, any number of other RRC messages could also or alternatively be used for signaling LWA aggregation suspension and resumption, as desired. For example, another way for a UE to request to Suspend/Resume LWA aggregation could include reusing a WLAN status indication RRC message. In such a case, this message may carry a new cause value that indicates to the eNB that the UE requests to suspend or resume Wi-Fi aggregation.

In the scenario illustrated in FIG. 11, suspend/resume procedures may be invoked by way of MAC messages (e.g., using reserved LCID values to define the new control elements, and/or reusing or repurposing existing control elements). As shown, after initially establishing an LWA aggretation session such as according to the method of FIG. 7 and communicating data to the UE 1106 aggregated between the WT 1104 and the eNB 1102, in 1112 the UE 1106 may determine that it has one or more other Wi-Fi transactions to perform, e.g., with a watch, tablet, laptop, and/or another such wireless device, indicated in FIG. 11 simply as 'other device 1108' for convenience.

In order to connect with the other device 1108 for the Wi-Fi data exchange while the aggregation session is in place, in 1114, the UE 1106 and the eNB 1102 may exchange MAC CE LWA Suspend Request and MAC CE LWA Suspend Complete messages. Based on this exchange, the eNB 1102 may refrain from providing data to the UE 1106 by way of the Wi-Fi link between the UE 1106 and the WT 1104. Note that the WT 1104 and the UE 1106 may remain associated (e.g., the UE 1106 may remain a member of the BSS of the WT 1104) while the LWA session is suspended. While the LWA session is suspended, in 1116, the UE 1106 may perform its wireless transaction with the other device 1108 via Wi-Fi communication. Once the wireless transaction is complete, in 1118, the UE 1106 and the eNB 1102 may exchange MAC CE LWA Resume Request and MAC CE LWA Suspend Complete messages. Based on this exchange, the eNB 1102 may resume providing data to the UE 1106 by way of the Wi-Fi link between the UE 1106 and the WT 1104. Since the WT 1104 and the UE 1106 may have remained associated throughout, the UE 1106 may be able to avoid any or all of performing Wi-Fi measurements, reporting those measurements to the eNB 1102, or performing signaling to associate with the WT 1104 to resume the LWA session.

Note that while the communication flows of FIGS. 10-11 relate to signaling messages that could be used to provide suspend/resume support specifically with respect to LWA sessions for illustrative purposes, it should be recognized that such signaling messages and suspend/resume support are not limited to LWA implementations, and that similar types of signaling messages (e.g., including various types of RRC messages and/or MAC CEs) may also or alternatively be used in conjunction with LWIP sessions and/or other types of LTE/Wi-Fi aggregation sessions to provide suspend/resume support.

In the following further exemplary embodiments are provided.

One set of embodiments may include a method, comprising: by a first wireless device: establishing a communication link with a base station, wherein the communication link with a base station aggregates radio resources according to a first wireless communication technology and a second wireless communication technology; suspending use of radio resources according to the second wireless communication technology by the communication link with the base station; performing wireless communication with a second wireless device according to the second wireless communication technology while use of radio resources according to the second wireless communication technology by the communication link with the base station is suspended; and resuming use of radio resources according to the second wireless communication technology by the communication link with the base station after performing the wireless communication with the second wireless device according to the second wireless communication technology.

According to some embodiments, the method further comprises: determining to perform the wireless communication with the second wireless device while the communication link is aggregating radio resources according to the first wireless communication technology and the second wireless communication technology; wherein suspending use of radio resources according to the second wireless communication technology by the communication link with the base station is based at least in part on determining to perform the wireless communication with the second wireless device while the communication link is aggregating radio resources according to the first wireless communication technology and the second wireless communication technology.

According to some embodiments, the radio resources of the communication link with the base station according to the second wireless communication technology are maintained while use of radio resources according to the second wireless communication technology by the communication link is suspended.

According to some embodiments, suspending use of radio resources according to the second wireless communication technology by the communication link with the base station comprises indicating to the base station to use only the radio resources according to the first wireless communication technology while use of radio resources according to the second wireless communication technology is suspended, wherein resuming use of radio resources according to the second wireless communication technology by the communication link with the base station comprises indicating to the base station to resume using radio resources according both the first wireless communication technology and the second wireless communication technology.

According to some embodiments, the first wireless communication technology is a cellular communication technology, wherein the second wireless communication technology is a wireless local area networking (WLAN) technology, wherein establishing the communication link with the base station comprises establishing a cellular link with the base station and establishing a WLAN link with an access point coupled to or comprised in the base station, wherein the WLAN link with the access point is maintained while use of radio resources according to the second wireless communication technology by the communication link with the base station is suspended.

Another set of embodiments may include a method, comprising: by a base station: establishing a communication link with a wireless device, wherein the communication link aggregates radio resources according to a first wireless communication technology and a second wireless communication technology; receiving an indication from the wireless device to suspend use of radio resources according to the second wireless communication technology for the communication link with the wireless device; suspending use of radio resources according to the second wireless communication technology for the communication link with the wireless device in response to the indication to suspend use of radio resources according to the second wireless communication technology for the communication link with the wireless device, wherein information for aggregating radio resources according to the first wireless communication technology and the second wireless communication technology is maintained while use of radio resources according to the second wireless communication technology for the communication link with the wireless device is suspended; receiving an indication from the wireless device to resume use of radio resources according to the second wireless communication technology for the communication link with the wireless device; and resuming use of radio resources according to the second wireless communication technology for the communication link with the wireless device in response to the indication to resume use of radio resources according to the second wireless communication technology for the communication link with the wireless device.

Yet another set of embodiments may include a device, comprising: an antenna; a radio operably coupled to the antenna; and a processing element operably coupled to the radio, wherein the antenna, radio, and processing element are configured to implement a method according to any of the preceding examples.

A further set of embodiments may include an apparatus, comprising a processing element configured to implement a method according to any of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A base station, comprising:
an antenna;
a radio operatively coupled to the antenna;
a processing circuitry operatively coupled to the radio;
wherein the antenna, radio, and processing circuitry are configured to:
establish a communication link with a wireless device, wherein the communication link aggregates radio resources according to a first wireless communication technology and a second wireless communication technology, wherein the first wireless communication technology is different from the second wireless communication technology, wherein establishing radio resource aggregation for the communication link comprises:
  indicating to the wireless device to perform one or more Wi-Fi acquisition measurements for each of one or more Wi-Fi terminals;
  receiving a measurement report from the wireless device in response to the indication to perform the one or more Wi-Fi acquisition measurements for each of the one or more Wi-Fi terminals;
  indicating to a selected Wi-Fi terminal to provide Wi-Fi radio resources to the wireless device;
  receiving an acknowledgement from the selected Wi-Fi terminal in response to the indicating to provide Wi-Fi radio resources to the wireless device;
  indicating to the wireless device to associate with the selected Wi-Fi terminal;
  receiving an indication from the wireless device that the wireless device is associated with the selected Wi-Fi terminal; and
  receiving an indication from the selected Wi-Fi terminal that the wireless device is associated with the selected Wi-Fi terminal;
receive an indication from the wireless device to suspend use of radio resources according to the second wireless communication technology for the communication link with the wireless device;
suspend use of radio resources according to the second wireless communication technology for the communication link with the wireless device in response to the indication to suspend use of radio resources according to the second wireless communication technology for the communication link with the wireless device;
receive an indication from the wireless device to resume use of radio resources according to the second wireless communication technology for the communication link with the wireless device; and
resume use of radio resources according to the second wireless communication technology for the communication link with the wireless device in response to the indication to resume use of radio resources according to the second wireless communication technology for the communication link with the wireless device.

2. The base station of claim 1,
wherein information for aggregating radio resources according to the first wireless communication technology and the second wireless communication technology is maintained while use of radio resources according to the second wireless communication technology for the communication link with the wireless device is suspended,
wherein the information for aggregating radio resources according to the first wireless communication technology and the second wireless communication technology is used by the base station when resuming use of radio resources according to the second wireless communication technology for the communication link with the wireless device.

3. The base station of claim 1,
wherein the indication to suspend use of radio resources according to the second wireless communication technology for the communication link with the wireless device is received using the first wireless communication technology, wherein the indication to resume use of radio resources according to the second wireless communication technology for the communication link with the wireless device is received using the first wireless communication technology.

4. The base station of claim 1,
wherein resuming use of radio resources according to the second wireless communication technology comprises a simplified procedure relative to establishing radio resource aggregation for the communication link.

5. The base station of claim 1,
wherein the first wireless communication technology comprises long term evolution (LTE),
wherein the second wireless communication technology comprises wireless local area networking (WLAN),
wherein to establish radio resource aggregation for the communication link, the antenna, radio, and processing circuitry are further configured to utilize one of LTE-WLAN Aggregation (LWA) or LTE-WLAN integration with Internet Protocol security tunnel (LWIP).

6. The base station of claim 1, wherein said receiving an indication from the wireless device to suspend use of radio resources according to the second wireless communication technology for the communication link with the wireless device is based on a length of time of a wireless communication by the wireless device with another wireless device using the second communication technology.

7. The base station of claim 1, wherein said receiving the indication from the wireless device to suspend use of radio resources according to the second wireless communication technology for the communication link with the wireless device is based on a length of time of a different wireless communication of the wireless device using the second communication technology being less than a threshold length of time.

8. A method of operating a base station, comprising:
by a base station:
  establishing a communication link with a wireless device, wherein the communication link aggregates radio resources according to a first wireless communication technology and a second wireless communication technology, wherein the first wireless communication technology is different from the second wireless communication technology, wherein establishing radio resource aggregation for the communication link comprises:
    indicating to the wireless device to perform one or more Wi-Fi acquisition measurements for each of one or more Wi-Fi terminals;
    receiving a measurement report from the wireless device in response to the indication to perform the one or more Wi-Fi acquisition measurements for each of the one or more Wi-Fi terminals;
    indicating to a selected Wi-Fi terminal to provide Wi-Fi radio resources to the wireless device;
    receiving an acknowledgement from the selected Wi-Fi terminal in response to the indicating to provide Wi-Fi radio resources to the wireless device;
    indicating to the wireless device to associate with the selected Wi-Fi terminal;
    receiving an indication from the wireless device that the wireless device is associated with the selected Wi-Fi terminal; and
    receiving an indication from the selected Wi-Fi terminal that the wireless device is associated with the selected Wi-Fi terminal;

receiving an indication from the wireless device to suspend use of radio resources according to the second wireless communication technology for the communication link with the wireless device;

suspending use of radio resources according to the second wireless communication technology for the communication link with the wireless device in response to the indication to suspend use of radio resources according to the second wireless communication technology for the communication link with the wireless device;

receiving an indication from the wireless device to resume use of radio resources according to the second wireless communication technology for the communication link with the wireless device; and resuming use of radio resources according to the second wireless communication technology for the communication link with the wireless device in response to the indication to resume use of radio resources according to the second wireless communication technology for the communication link with the wireless device.

9. The method of claim 8,
wherein said suspending use of the radio resources according to the second wireless communication technology comprises maintaining information for aggregating radio resources according to the first wireless communication technology and the second wireless communication technology,
wherein said resuming use of the radio resources according to the second wireless communication technology comprises using the information for aggregating radio resources according to the first wireless communication technology and the second wireless communication technology.

10. The method of claim 8,
wherein the indication to suspend use of radio resources according to the second wireless communication technology for the communication link with the wireless device is received using the first wireless communication technology,
wherein the indication to resume use of radio resources according to the second wireless communication technology for the communication link with the wireless device is received using the first wireless communication technology.

11. The method of claim 8,
wherein resuming use of radio resources according to the second wireless communication technology comprises a simplified procedure relative to establishing radio resource aggregation for the communication link.

12. The method of claim 8,
wherein the first wireless communication technology comprises long term evolution (LTE),
wherein the second wireless communication technology comprises wireless local area networking (WLAN),
wherein to establish radio resource aggregation for the communication link, the antenna, radio, and processing circuitry are further configured to utilize one of LTE-WLAN Aggregation (LWA) or LTE-WLAN integration with Internet Protocol security tunnel (LWIP).

13. The method of claim 8, wherein said receiving an indication from the wireless device to suspend use of radio resources according to the second wireless communication technology for the communication link with the wireless device is based on a length of time of a wireless communication by the wireless device with another wireless device using the second communication technology.

14. The method of claim 8, wherein said receiving the indication from the wireless device to suspend use of radio resources according to the second wireless communication technology for the communication link with the wireless device is based on a length of time of a different wireless communication of the wireless device using the second communication technology being less than a threshold length of time.

15. An apparatus for implementation in a base station, comprising:
one or more processing circuitries, configured to:
establish a communication link with a wireless device, wherein the communication link aggregates radio resources according to a first wireless communication technology and a second wireless communication technology, wherein the first wireless communication technology is different from the second wireless communication technology, wherein establishing radio resource aggregation for the communication link comprises:
indicating to the wireless device to perform one or more Wi-Fi acquisition measurements for each of one or more Wi-Fi terminals;
receiving a measurement report from the wireless device in response to the indication to perform the one or more Wi-Fi acquisition measurements for each of the one or more Wi-Fi terminals;
indicating to a selected Wi-Fi terminal to provide Wi-Fi radio resources to the wireless device;
receiving an acknowledgement from the selected Wi-Fi terminal in response to the indicating;
indicating to the wireless device to associate with the selected Wi-Fi terminal;
receiving an indication from the wireless device that the wireless device is associated with the selected Wi-Fi terminal; and
receiving an indication from the selected Wi-Fi terminal that the wireless device is associated with the selected Wi-Fi terminal;
receive an indication from the wireless device to suspend use of radio resources according to the second wireless communication technology for the communication link with the wireless device;
suspend use of radio resources according to the second wireless communication technology for the communication link with the wireless device in response to the indication to suspend use of radio resources according to the second wireless communication technology for the communication link with the wireless device;
receive an indication from the wireless device to resume use of radio resources according to the second wireless communication technology for the communication link with the wireless device; and
resume use of radio resources according to the second wireless communication technology for the communication link with the wireless device in response to the indication to resume use of radio resources according to the second wireless communication technology for the communication link with the wireless device.

16. The apparatus of claim 15,
wherein information for aggregating radio resources according to the first wireless communication technology and the second wireless technology is maintained while use of radio resources according to the second wireless communication technology for the communication link with the wireless device is suspended, wherein the information for aggregating radio resources according to the first wireless communication technology and the second wireless communication technology is used by the base station when resuming use of radio resources according to the second wireless communication technology for the communication link with the wireless device.

17. The apparatus of claim 15, wherein the indication to suspend use of radio resources according to the second wireless communication technology for the communication link with the wireless device is received using the first wireless communication technology, wherein the indication to resume use of radio resources according to the second wireless communication technology for the communication link with the wireless device is received using the first wireless communication technology.

18. The apparatus of claim 15, wherein resuming use of radio resources according to the second wireless communication technology comprises a simplified procedure relative to establishing radio resource aggregation for the communication link.

19. The apparatus of claim 15, wherein the first wireless communication technology comprises long term evolution (LTE), wherein the second wireless communication technology comprises wireless local area networking (WLAN), wherein to establish radio resource aggregation for the communication link, the antenna, radio, and processing circuitry are further configured to utilize one of LTE-WLAN Aggregation (LWA) or LTE-WLAN integration with Internet Protocol security tunnel (LWIP).

20. The apparatus of claim 15, wherein said receiving the indication from the wireless device to suspend use of radio resources according to the second wireless communication technology for the communication link with the wireless device is based on a length of time of a different wireless communication of the wireless device using the second communication technology being less than a threshold length of time.

\* \* \* \* \*